UNITED STATES PATENT OFFICE.

RICHARD BLAIR EARLE AND LUCAS PETRON KYRIAKIDES, OF CAMBRIDGE, MASSACHUSETTS, ASSIGNORS TO HOOD RUBBER CO., A CORPORATION OF MASSACHUSETTS.

PROCESS FOR PRODUCING ALDOL.

1,094,314.      Specification of Letters Patent.      Patented Apr. 21, 1914.

No Drawing.      Application filed March 21, 1912. Serial No. 685,295.

*To all whom it may concern:*

Be it known that we, RICHARD B. EARLE and LUCAS P. KYRIAKIDES, citizens of the United States, residing at Cambridge, Massachusetts, have invented certain new and useful Improvements in Processes for Producing Aldol, of which the following is a specification.

Our invention relates to a new and valuable process for producing aldol, $$(CH_3-CHOH-CH_2-CHO),$$

β-oxybutyraldehyde, which is a valuable aldehyde useful for the preparation of substances useful for pharmaceutical and technical purposes.

The new process consists in allowing liquid acetaldehyde ($CH_3CHO$) to come in contact for a short time with solid alkaline substances which are insoluble or only slightly soluble in the same, drawing off the liquid aldehydes and bringing fresh aldehyde in contact with the alkaline condensing agent again. This is accomplished by using an ordinary Soxhlet extraction apparatus, in which the vapors of aldehyde are condensed and dropped onto the alkaline condensing agent. When the level of the liquid reaches a certain point it is automatically siphoned off into the vessel below containing the boiling acetaldehyde, and the vapors again condense and drip into the chamber containing the alkaline condensing agent.

As alkaline condensing agents we may use alkaline or alkaline earth hydrates or carbonates, disodium hydrogen phosphate, borax or alkaline sulfites.

In order to illustrate the new process more fully the following example is given: The apparatus is constructed on the principle of a Soxhlet extractor and needs little description. Dry acetaldehyde is boiled in a suitable vessel and the vapors are condensed by a suitable upright condenser. The condensed acetaldehyde drips into a chamber filled with dry slaked lime and when the liquid reaches a level corresponding to the top of the siphon with which the chamber is provided, it is emptied from the bottom, the liquid being carried back to the vessel in which the acetaldehyde is boiled. Thus the aldehyde is submitted intermittently to the action of the slaked lime, and as aldol possesses a high boiling point it does not pass up again with the vapors of the aldehyde, so that the concentration of aldol in the acetaldehyde continually increases. As the liquid is only subjected to the action of the slaked lime for a short period any secondary actions are avoided. After a time the vessel contains a very concentrated solution of aldol which is easily obtained pure by distilling off the acetaldehyde and any paraldehyde which may be also formed. Any lime carried over mechanically may be neutralized by providing the vessel with suitable neutralizing agents.

The reaction is a condensation of acetaldehyde with itself, as $$CH_3CHO + CH_3CHO = CH_3-CHOHCH_2-CHO.$$

If carried out under suitable conditions so that no acetaldehyde is lost by evaporation, the yield is nearly theoretical.

We claim:—

1. The process of producing aldol which consists in repeatedly bringing liquid acetaldehyde in contact with calcium hydrate.

2. The process of producing aldol which consists in repeatedly bringing acetaldehyde in contact with an alkaline condensing agent.

3. The herein described method of producing aldol which consists in vaporizing acetaldehyde, condensing the vapors and bringing the same into contact with a dry alkaline agent, withdrawing the liquid from said agent, and reëvaporating the acetaldehyde in said liquid and continuing the process until a concentrated solution of aldol is secured.

4. The herein described method of producing aldol which consists in vaporizing acetaldehyde, condensing the vapors and bringing the same into contact with dry slaked lime, withdrawing the liquid from said lime, and reëvaporating the acetaldehyde in said liquid and continuing the process until a concentrated solution of aldol is secured.

In testimony whereof, we affix our signatures in presence of two witnesses.

RICHARD BLAIR EARLE.
             LUCAS PETRON KYRIAKIDES.

Witnesses:
     J. R. MOTT,
     M. A. HACARTY.